United States Patent
Hassan et al.

(10) Patent No.: US 10,885,493 B2
(45) Date of Patent: Jan. 5, 2021

(54) METHOD AND SYSTEM FOR PLANOGRAM COMPLIANCE CHECK BASED ON VISUAL ANALYSIS

(71) Applicant: Tata Consultancy Services Limited, Mumbai (IN)

(72) Inventors: Ehtesham Hassan, Gurgaon (IN); Anurag Saran, Gurgaon (IN); Preeti Johri, Gurgaon (IN); Shilpa Yadukumar Rao, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 99 days.

(21) Appl. No.: 15/154,337

(22) Filed: May 13, 2016

(65) Prior Publication Data
US 2016/0335590 A1    Nov. 17, 2016

(30) Foreign Application Priority Data
May 16, 2015    (IN) .......................... 1927/MUM/2015

(51) Int. Cl.
*G06Q 10/08*    (2012.01)
*G06K 9/78*    (2006.01)
(Continued)

(52) U.S. Cl.
CPC ......... *G06Q 10/087* (2013.01); *G06K 9/6215* (2013.01); *G06K 9/78* (2013.01); *G06Q 10/08* (2013.01); *G06Q 30/02* (2013.01)

(58) Field of Classification Search
CPC ...... G06K 9/6215; G06K 9/78; G06Q 10/087; G06Q 10/08; G06Q 30/02
See application file for complete search history.

(56) References Cited

U.S. PATENT DOCUMENTS

| | | | |
|---|---|---|---|
| 5,999,653 A * | 12/1999 | Rucklidge | G06K 9/6211 382/227 |
| 7,949,568 B2 | 5/2011 | Fano et al. | |

(Continued)

FOREIGN PATENT DOCUMENTS

| | | |
|---|---|---|
| EP | 2 375 365 A1 | 10/2011 |
| EP | 2 662 831 A2 | 11/2013 |

OTHER PUBLICATIONS

Huang et al., "Spatial Color Indexing and Applications", Dec. 1999, Kluwer Academic Publishers, Int. Journal of Computer Vision, vol. 35, iss. 3, p. 245-268.*

(Continued)

*Primary Examiner* — Vincent Rudolph
*Assistant Examiner* — Timothy Choi
(74) *Attorney, Agent, or Firm* — Finnegan, Henderson, Farabow, Garrett & Dunner LLP

(57) ABSTRACT

A method and system is provided for planogram compliance check based on visual analysis. The present method and system comprises acquiring a product shelf image, identifying a region of interest (ROI) from the at least one product shelf image, extracting a perspective distortion rectification of the identified ROI to generate a rectified shelf image, applying Hausdroff distance based image map for occupancy estimation in shelf images extracting one or more rows from the rectified shelf image wherein the rectified shelf image comprises a plurality of horizontal row partitions, and deriving a product count and placement information for each of the extracted one or more rows based on the extracted rows and the occupancy estimation.

6 Claims, 6 Drawing Sheets

(51) Int. Cl.
*G06K 9/62* (2006.01)
*G06Q 30/02* (2012.01)

(56) References Cited

U.S. PATENT DOCUMENTS

| | | | |
|---|---|---|---|
| 8,189,855 B2* | 5/2012 | Opalach | G06Q 10/087 |
| | | | 382/100 |
| 8,630,924 B2 | 1/2014 | Groenevelt et al. | |
| 2008/0077511 A1* | 3/2008 | Zimmerman | G06Q 10/00 |
| | | | 705/28 |
| 2008/0082426 A1* | 4/2008 | Gokturk | G06Q 30/0623 |
| | | | 705/26.62 |
| 2010/0171826 A1 | 7/2010 | Hamilton et al. | |
| 2012/0202515 A1* | 8/2012 | Hsu | G06Q 10/087 |
| | | | 455/456.1 |
| 2012/0301032 A1* | 11/2012 | Kawanishi | G06F 16/583 |
| | | | 382/190 |
| 2013/0223673 A1* | 8/2013 | Davis | G06K 9/78 |
| | | | 382/100 |
| 2014/0003727 A1 | 1/2014 | Lortz et al. | |
| 2015/0046299 A1 | 2/2015 | Yan | |
| 2015/0302027 A1* | 10/2015 | Wnuk | G06F 17/30268 |
| | | | 382/305 |
| 2016/0171707 A1* | 6/2016 | Schwartz | G06K 9/00201 |
| | | | 382/180 |

OTHER PUBLICATIONS

Hsu, Liao, et al., "Smart Pantries for Homes" Oct. 2006, IEEE, 2006 IEEE Int. Conf. on Systems, Man, and Cybernetics, p. 4276-4283. (Year: 2006).*

Chen et al., "Optical PCB inspection system based on Hausdorff distance", Feb. 2005, SPIE, Proc. SPIE 5679, Machine Vision Applications in Industrial Inspection XIII, vol. 5679, p. 53-61 (Year: 2005).*

* cited by examiner

METHOD AND SYSTEM FOR PLANOGRAM COMPLIANCE CHECK BASED ON VISUAL ANALYSIS

PRIORITY CLAIM

This U.S. patent application claims priority under 35 U.S.C. § 119 to: India Application No. 1927/MUM/2015, filed on May 16, 2015. The entire contents of the aforementioned application are incorporated herein by reference.

TECHNICAL FIELD

This disclosure relates generally to planogram compliance check, and more particularly to planogram compliance check based on visual analysis.

BACKGROUND

Planogram is a model that indicates the placement of retail products on shelves for customer ease. The research in retail marketing has shown that maintaining the planogram compliance can improve the overall profit by significant measure.

Most of the previous approaches dealing with the tags or ancient accounting and inventory management methods. The RFID based approach faces the problem of exponential cost of sensor installation, and time-consuming hard work of attaching the tag with every product and removing them again at the billing counter. Additionally, in-spite of being capital intensive, desired results are not produced. The inventory based methods maintain the product log at the checkout point, and work with assumption that if a product is selected, it would be replaced at the same spot. A fallacy which is shared with some of the RFID/Sensor based approaches. These assumptions cannot be considered to be valid especially in conditions of high traffic or during the off-season when low stocks are maintained on the shelves. There have also been some image based analysis, which can cater to some of the problems discussed above. Nevertheless, some of these approaches rely on fixed or mounted cameras for monitoring requiring template images for all of the products available in the store. Also this approach is not able to properly test planogram compliance, if the front-face of product is not clearly visible.

SUMMARY

Embodiments of the present disclosure present technological improvements as solutions to one or more of the above-mentioned technical problems recognized by the inventors in conventional systems. For example, in one embodiment, the present application discloses a computer implemented method for planogram compliance check based on visual analysis comprising steps of capturing at least one product shelf images using an image capture device (200). The method further comprises identifying a region of interest (ROI) from the at least one product shelf images using an image preprocessing module (210). The method further comprises generating at least one rectified shelf image by applying a perspective distortion rectification of the identified region of interest (ROI). In an embodiment, the perspective distortion rectification is based on projective geometry rectification. The disclosed method further comprises extracting one or more rows from the rectified shelf image wherein the rectified shelf image comprises a plurality of horizontal row partitions using a row extraction module (212). The method further may comprise applying Hausdorff distance based image map for occupancy estimation for each of the extracted one or more rows from the rectified shelf image based on a preexisting Hausdorff based image map generated for a predefined reference shelf image using an occupancy computation module (214). Finally the method may also comprise the step of deriving a product count and a placement information for each of the extracted one or more rows based on the extracted rows and the estimated occupancy using a product count and placement module (216).

In another embodiment, the present application also discloses system (102) comprising an image capture device (200) operatively coupled to the system, a processor (202) and an interface (204), a memory (206) coupled to said processor (202), the system (102) comprising, the image capture device (200) configured to capture at least one product shelf images, an image preprocessing module (210) configured to identify a region of interest (ROI) from the at least one product shelf images. Further the image preprocessing module (210) is configured generate at least one rectified shelf image by applying a perspective distortion rectification of the identified region of interest (ROI). In an embodiment the perspective distortion rectification is based on projective geometry rectification. The system (102) further comprises a row extraction module (212) configured to extract one or more rows from the rectified shelf image wherein the rectified shelf image comprises a plurality of horizontal row partitions, an occupancy computation module (214) configured applying Hausdorff distance based image map for occupancy estimation for each of the extracted one or more rows from the rectified shelf image based on a preexisting Hausdorff based image map generated for a predefined reference shelf image and a product count and placement module (216) configured to derive a product count and placement information for each of the extracted one or more rows based on the extracted rows and the estimated occupancy.

In yet another embodiment, the application provides a non-transitory computer readable medium comprising thereon instruction which when executed by a possessor on a system, cause the processor to perform a method comprising capturing at least one product shelf images using an image capture device (200). The method further comprises identifying a region of interest (ROI) from the at least one product shelf images using an image preprocessing module (210). The method further comprises generating at least one rectified shelf image by applying a perspective distortion rectification of the identified region of interest (ROI). In an embodiment, the perspective distortion rectification is based on projective geometry rectification. The disclosed method further comprises extracting one or more rows from the rectified shelf image wherein the rectified shelf image comprises a plurality of horizontal row partitions using a row extraction module (212). The method further may comprise applying Hausdorff distance based image map for occupancy estimation for each of the extracted one or more rows from the rectified shelf image based on a preexisting Hausdorff based image map generated for a predefined reference shelf image using an occupancy computation module (214). Finally the method may also comprise the step of deriving a product count and a placement information for each of the extracted one or more rows based on the extracted rows and the estimated occupancy using a product count and placement module (216).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
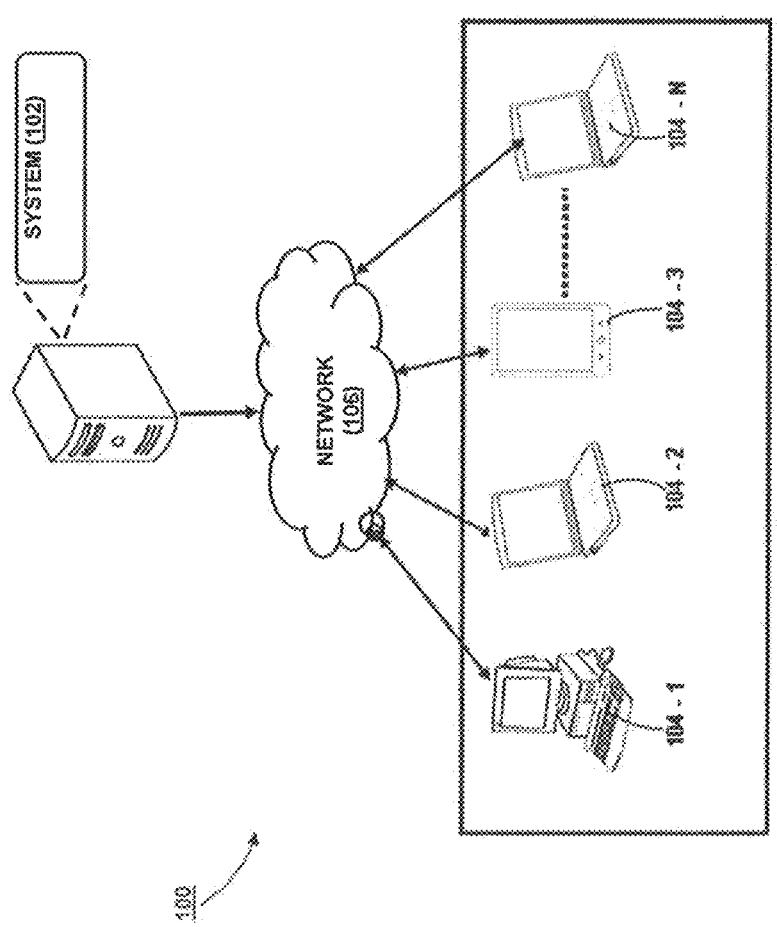
FIG. 1 a network implementation of a system for planogram compliance check based on visual analysis, in accordance with an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present application provides a computer implemented method and system for visual analysis for planogram compliance. The disclosed subject matter provides a system (200) comprising an image capture device communicatively coupled with a system comprising an image preprocessing module (210), a row extraction module (212), an occupancy detection module (214) and a count and placement identification module (216).

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for explanatory purposes to aid the reader in understanding the principles of the invention and the concepts contributed by the inventor(s) to furthering the art, and are to be construed as being without limitation to such specifically recited examples and conditions.

Referring now to FIG. 1, a network implementation 100 of a system 102 for planogram compliance using visual analysis is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
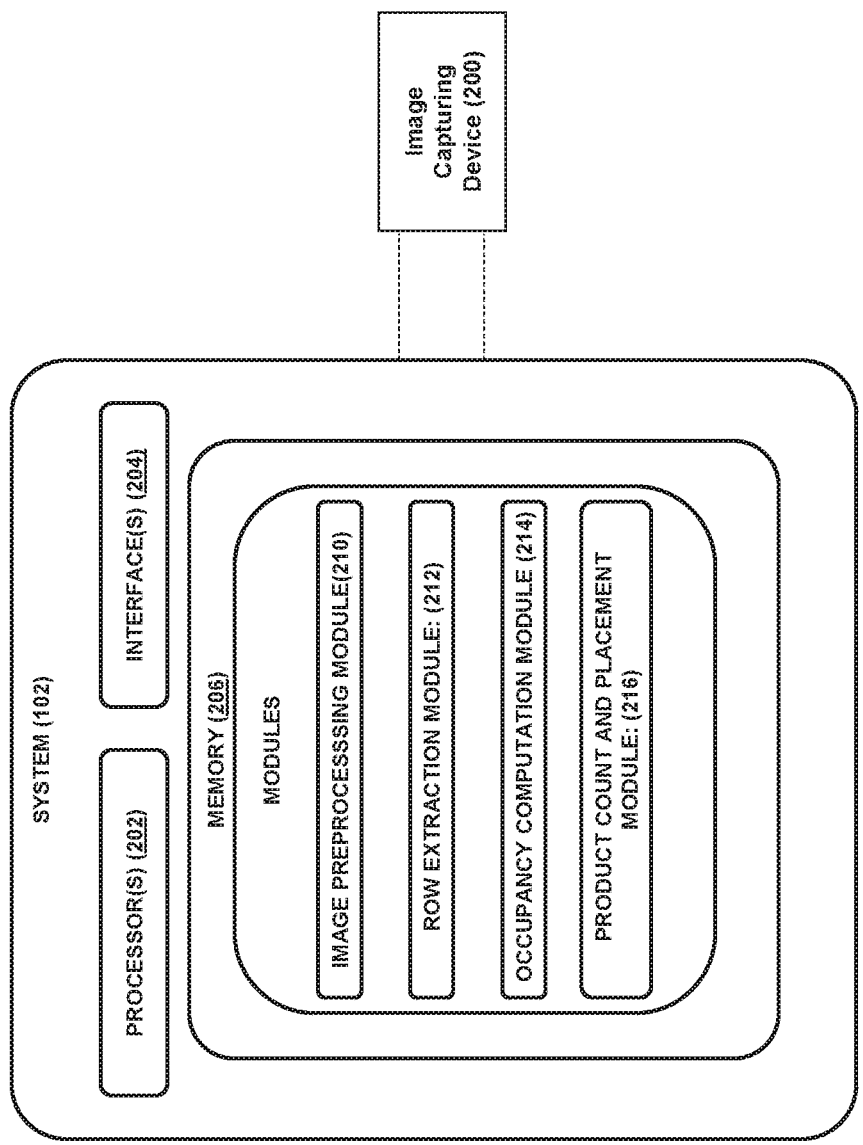
FIG. 2 illustrates the system for planogram compliance check based on visual analysis, in accordance with an embodiment of the present subject matter.

Referring now to FIG. 2, a system (102) for planogram compliance check based on visual analysis is illustrated according to an embodiment of the disclosed subject matter According to one embodiment, referring to FIG. 2, the system (102) is configured for planogram compliance check based on visual analysis more specifically, the system (102) comprises an image capture device (200) operatively coupled to the system, a processor (202) and an interface (204), a memory (206) coupled to said processor (202). Further more specifically, in an embodiment of the disclosed subject matter an image capture device (200) configured to capture at least one product shelf images. In another embodiment the system (102) further comprises an image preprocessing module (210) further configured to identify a region of interest (ROI) from the at least one product shelf images. In another embodiment, the image preprocessing module (210) is further configured to generating at least one rectified shelf image by applying a perspective distortion rectification of the identified region of interest (ROI). In an aspect the perspective distortion rectification is based on projective geometry rectification.

Capturing the product shelf image, wherein a perspective distortion rectification of images are captured, by any image capturing device available in the art, selecting the corner points of the product shelf using the touch screen of the image capturing device, rectifying perspective distortion in the image by using the corner points by applying conventional projective geometry rectification.

Further, referring again to FIG. 2 the system (102) further comprises a row extraction module (212) which may be configured to extract one or more rows from the rectified shelf image. In an aspect the rectified shelf image comprises a plurality of horizontal row partitions, wherein row extraction is based on identification of these horizontal row partitions on the rectified shelf image. In another embodiment the row extraction may also be applied to a preexisting reference shelf image. In yet another embodiment row extraction comprises the steps of generating a chg-img by finding all vertical changes in the image using Sobel derivative, applying Hough transform on the chg-img to detect all possible horizontal lines; and extracting the one or more rows by identifying most prominent horizontal lines in the shelf. The details of the row extraction process are explained further below in this application with reference to FIG. 6.

Referring again to FIG. 2, the system (102) further comprises an occupancy computation module (214) configured applying Hausdorff distance based image map for occupancy estimation for each of the extracted one or more rows from the rectified shelf image. In an embodiment the occupancy estimation module (214) is further configured to apply Hausdorff based image map such that occupancy is estimated as one of partially missing and completely missing, wherein partially missing refers to the situation where the a product is partially missing while completely missing is selected when a product is completely missing. In an embodiment the occupancy detection is based on matching the Hausdorff based image map for the rectified shelf image with a preexisting Hausdorff based image map for a predefined reference shelf image.

Referring again to FIG. 2 the system (102) further comprises a product count and placement module (216) which configured to derive a product count and placement information for each of the extracted one or more rows based on the extracted rows and the estimated occupancy. In an embodiment the product count and placement module (216) is configured to detect a product based on a texture properties of a product image wherein the product image is a part of the rectified product shelf image, by matching the texture properties of the product image with a predefined reference product shelf image. Further product count and placement module (216) may be configure to eliminate one or more false positives product detection by matching the color histogram of the product image with the predefined reference product shelf image.

Figure 3:
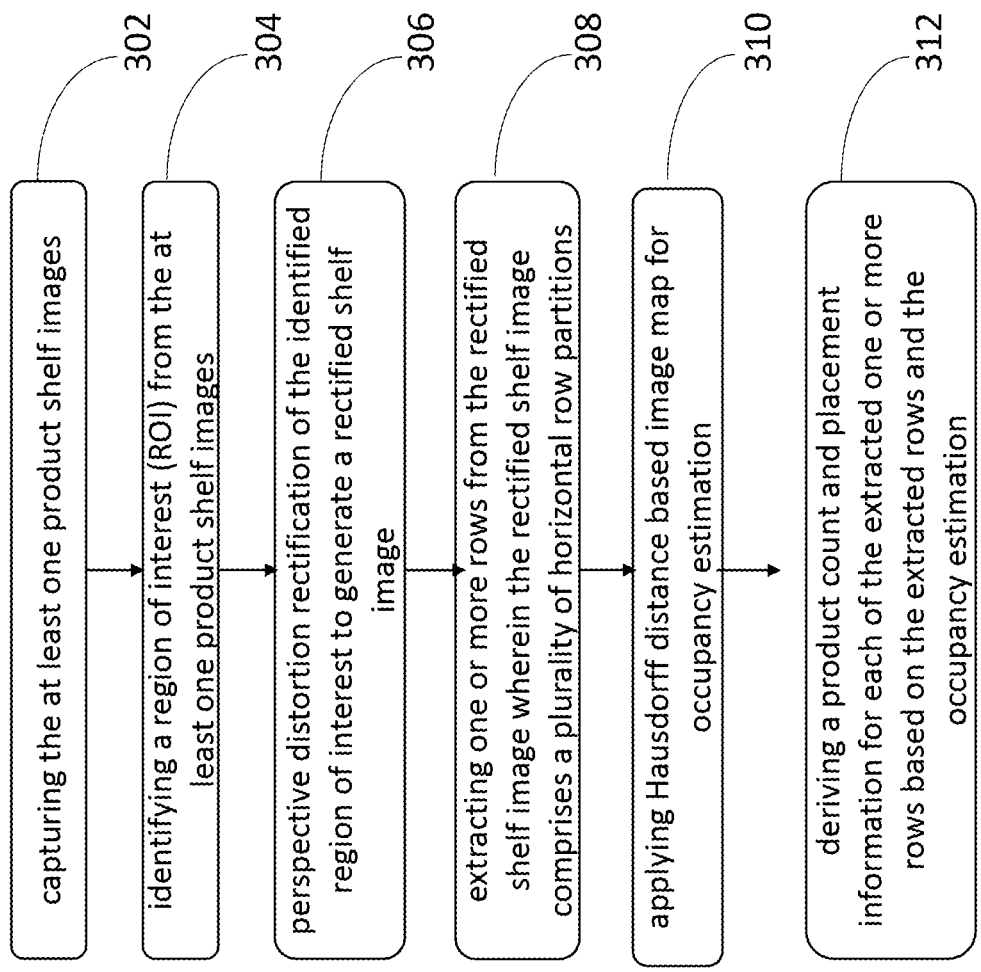
FIG. 3 shows a flow chart illustrating a method for planogram compliance using visual analysis of different products in accordance with an example embodiment of the present disclosure.

Referring now to FIG. 3, a flowchart a flow chart illustrating a method for planogram compliance using visual analysis of different products in accordance with an example embodiment of the present disclosure.

The process starts at the step 302 at least one product shelf image is captured using an image captured device (200) wherein the image capture device is operatively coupled to the system.

At the step 304 and 306 preprocessing is performed on the image wherein at the step 304, a region of interest (ROI) is identified from the captured at least one product shelf images. At the step 306 at least one rectified shelf image is generated by applying a perspective distortion rectification of the identified region of interest (ROI). In an aspect the perspective distortion rectification is based on projective geometry rectification.

At the step 308, one or more rows are extracted from the rectified shelf image. In an aspect the rectified shelf image comprises a plurality of horizontal row partitions, wherein row extraction is based on identification of these horizontal row partitions on the rectified shelf image. In another embodiment the row extraction may also be applied to a preexisting reference shelf image. In yet another embodiment row extraction comprises the steps of generating a chg-img by finding all vertical changes in the image using Sobel derivative, applying Hough transform on the chg-img to detect all possible horizontal lines; and extracting the one or more rows by identifying most prominent horizontal lines in the shelf.

At the step 310 Hausdorff distance based image map is applied for occupancy estimation for each of the extracted one or more rows from the rectified shelf image. In an embodiment Hausdorff based image map may be applied such that occupancy is estimated as one of partially missing and completely missing, wherein partially missing refers to the situation where the a product is partially missing while completely missing is the situation when a product is completely missing. Occupancy estimation results may be for each of the extracted one or more rows or for the entire shelf. In an embodiment the occupancy detection is based on matching the Hausdorff based image map for the rectified shelf image with a preexisting Hausdorff based image map for a predefined reference shelf image.

At the step 312 a product count and placement information is derived for each of the extracted one or more rows based on the extracted rows and the estimated occupancy. In an embodiment a product is detected based on a texture properties of a product image wherein the product image is a part of the rectified product shelf image, by matching the texture properties of the product image with a predefined reference product shelf image. Further in another embodiment one or more false positives product detection may be eliminated by matching the color histogram of the product image with the predefined reference product shelf image.

The above described method is now explained in detail with reference to the drawings FIG. 4 to FIG. 6

Computing occupancy based on Hausdorff map—calculating a local distance map for product shelf image captured and a reference image based on Hausdorff metric and comparing the product shelf image and the referenced image using the below equation:

$$H(A;B) = \max\{h(A;B); h(B;A)\} \quad \text{Equation 1:}$$

$$h(A;B) = \max(a \in 2)\{\min(b \in B)\{d(a;b)\}\} \quad \text{Equation 2:}$$

Here A, and B are the local areas of reference image and product shelf image Whereas a and b in equation 2 are smaller divisions in A and B, i.e., A and B are the super-masks, and a and b denote sub-masks in corresponding super-masks. h(A;B) in the equation 1 denotes the directed Hausdorff distance as described in equation 2.

Computing occupancy method using Hausdorff metric based distance map. It includes individual identification of complete and partial missing cases.

Identification of Completely Missing Case

Figure 4:
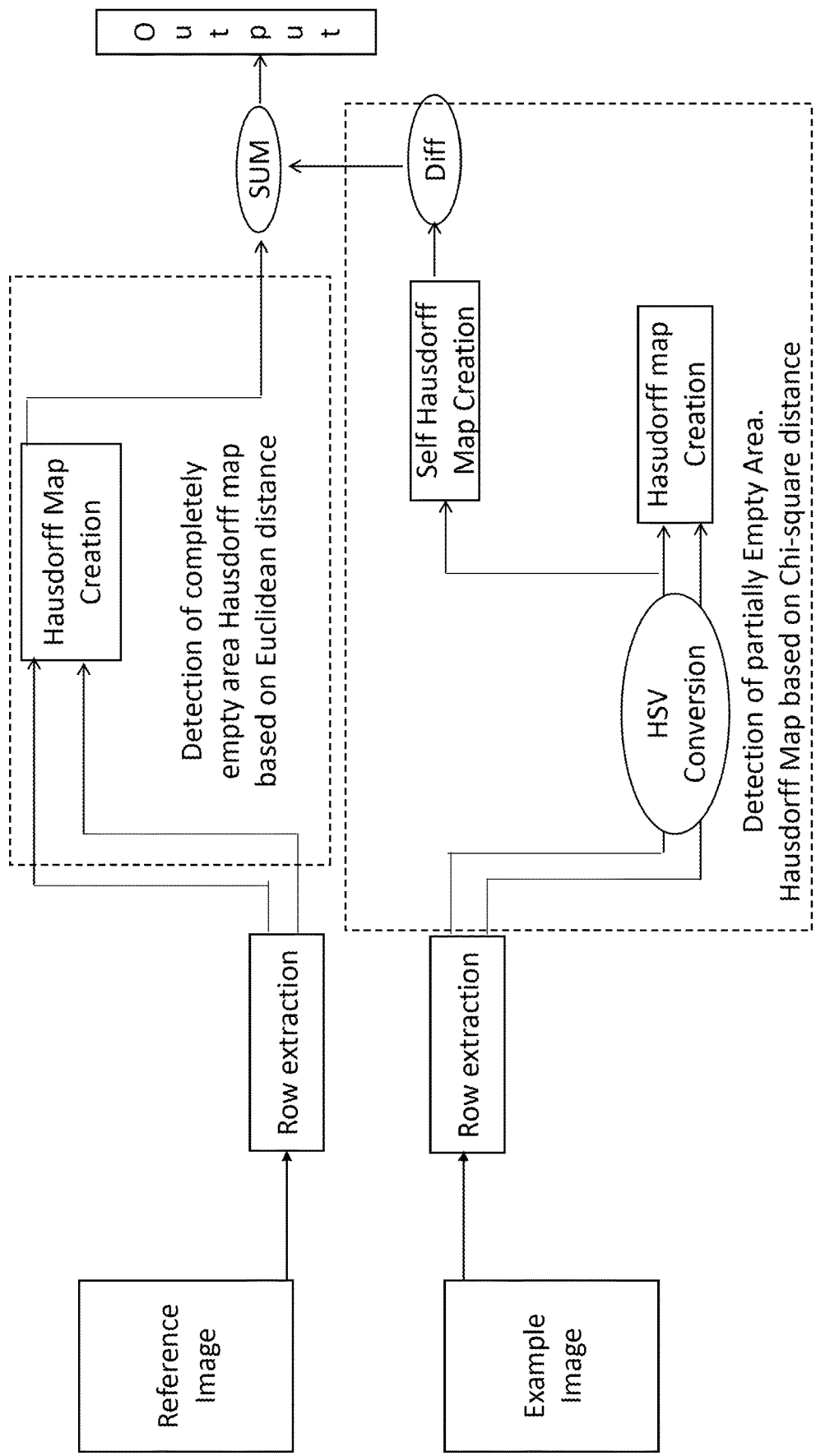
FIG. 4 shows a flow chart illustrating a method for planogram compliance using visual analysis for Partial or Complete presence of different products in accordance with an example embodiment of the present disclosure.

In reference to FIG. 4, for identification of completely missing product, Euclidean distance is applied as the comparison metric d (a; b) with all computations performed in RGB color space. The metric and the selected color space identifies the missing, misplaced and wrongly placed products using the marked difference in the RGB intensity values with the reference image. The sub-masks a and b are expressed as the mean value of pixel intensities in RBG planes in their defined region, using these values a, b, and d as Euclidean distance, the product shelf distance map is plotted and Otsu's thresholding criterion is applied.

In reference to FIG. 4, for identification of partially missing product, Hausdorff map based on Chi-Square distance as shown in equation 3.

$$d(H1; H2) = \sum_I (H1(I) - H2(I))2/H1(I) \qquad \text{Equation 3}$$

Referring to equation 3, H1 and H2 are the histograms of the sub-masks of reference and product shelf image. The noisy artifacts generated during this process is addressed by generating self Hausdorff map of the reference image using horizontal and vertical translation as shown in the FIG. 5.

Product Shelf Row Identification

In reference to FIG. 4, the steps include deriving all the vertical changes in the image using Sobel derivative with an output chg_img, followed by applying Hough transform on the chg_img to detect all possible straight lines. An automated solution is provided for selection of related parameters, i.e., Sobel derivative threshold, and Voting threshold in Hough transform based line detection. The solution includes an algorithm as follows:

Line Reduction Algorithm
    1: procedure reduceLines (sobT h; hoghTh; img)
    2: maxLines←(img.ht/10)
    3: while linDtcd>maxLines do
    4: linDtcd←HoughLines (sobTh, hoghTh, img)
    5: incr←(linDtcd/maxLines)
    6: hoghTh←(hoghTh+incr)
    7: sobTh←sobTh (incr/2)
    8: end while
    9: return sobT h; hoghTh
    10: end procedure Product Count and Placement Computation A row level product count from the above steps assumes the availability of exact product templates. The product count and computation follows two steps: a) detecting product based on texture properties of the product image, b) Eliminating false positives using color features.

a) Detecting product based on texture properties of the product image: applying a SURF feature based detection for first level of product detection. Identifying slide window with respect to the aspect-ratio of the product-template, wherein the height of the window being equal to the height of the.

b) Eliminating false positives using color features: applying second level of product detection for removal of false positives by matching the color histogram between the template image and the detected regions in example image.

Further, in another embodiment the method includes the step of applying normalized histogram and using Bhattacharya distance for measuring the similarity between two distributions. The Bhattacharya distance between two equalized histograms h1, and h2 is defined as in eq. 4.

$$d(h1; h2) = \sqrt{\left(1 - \sum_i \left(\sqrt{(h1(i) * h2(i))}\right)\right)} \qquad \text{Equation 4}$$

Figure 5:
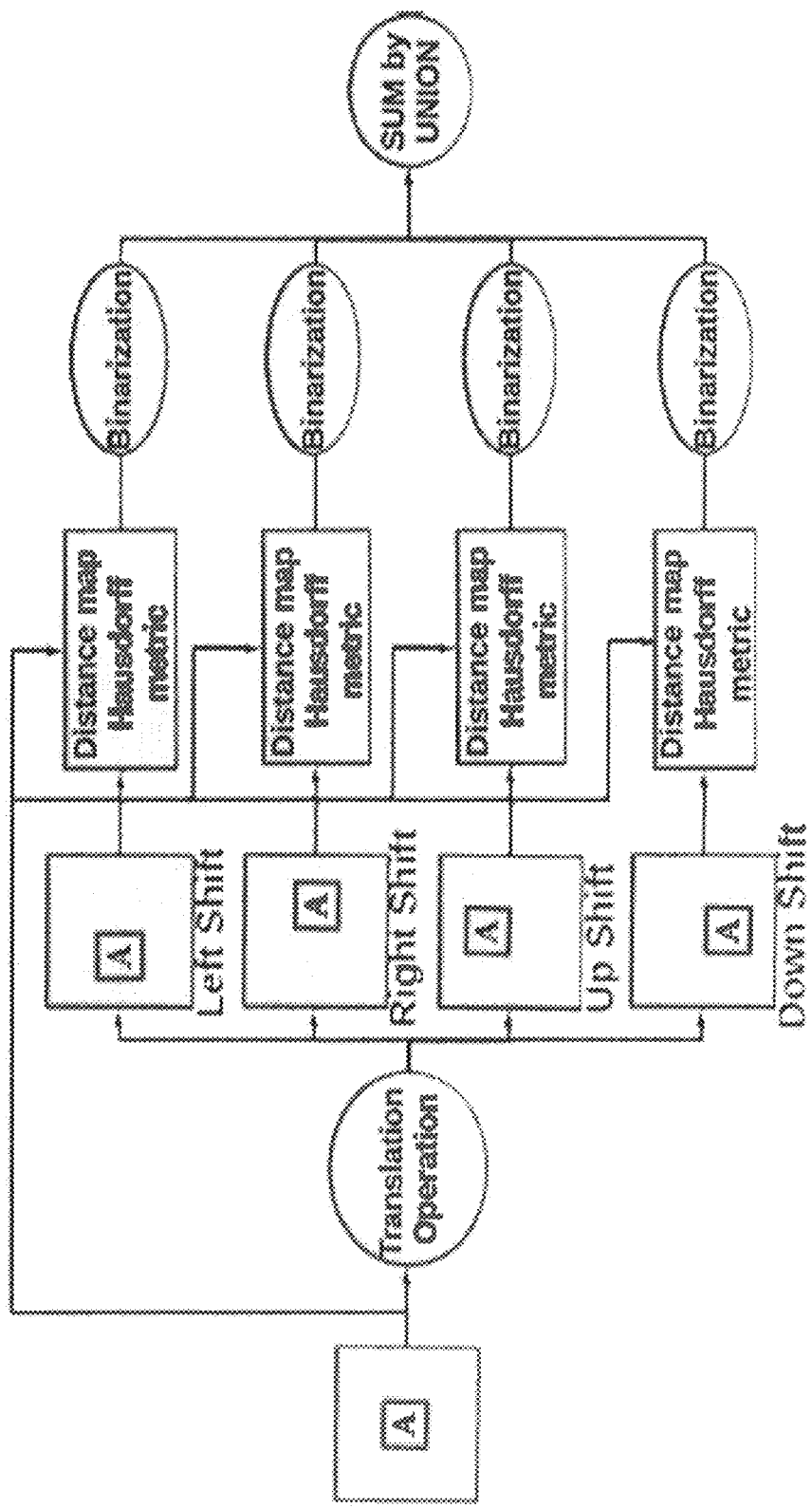
FIG. 5 shows a flow chart illustrating a Self Hausdroff Self-Hausdorff map creation in accordance with an example embodiment of the present disclosure.
Figure 6:
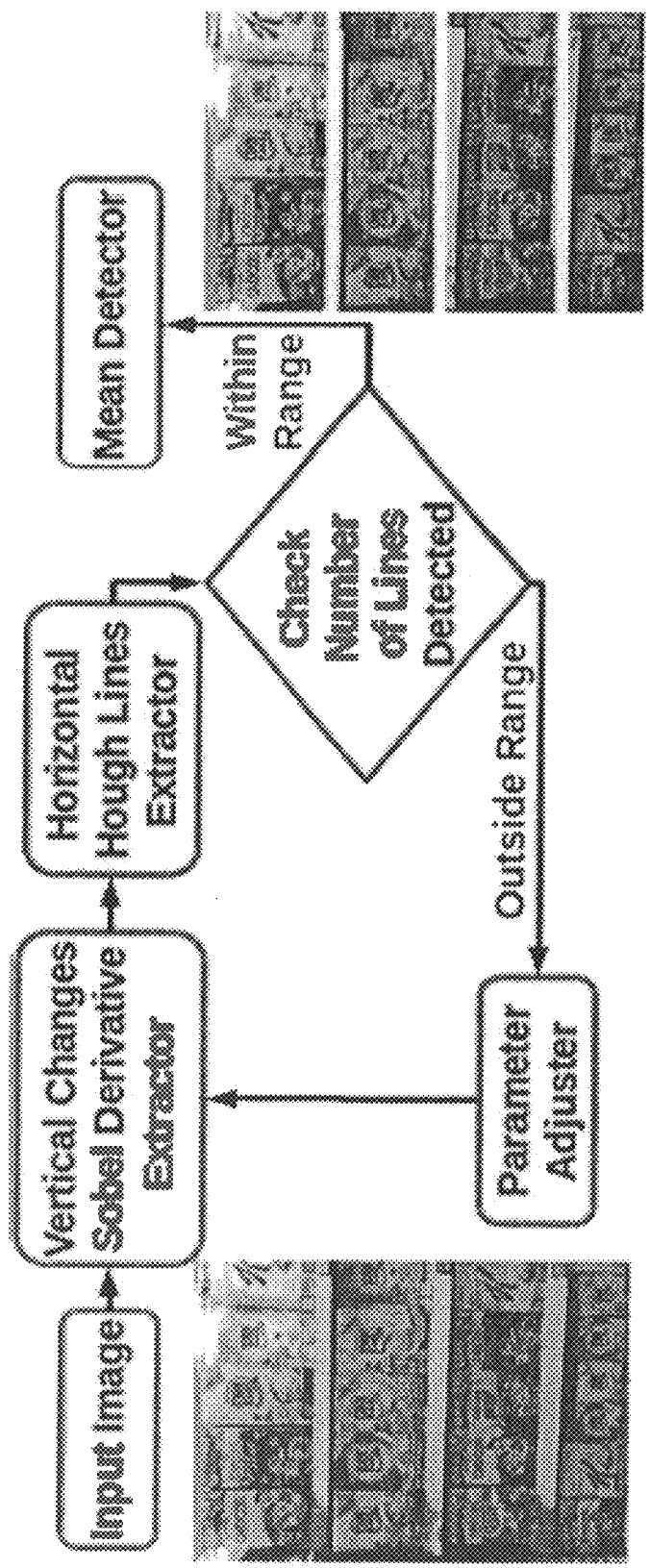
FIG. 6 shows a flow chart illustrating a method of row extraction in accordance with an example embodiment of the present disclosure.

The above described system performs the operation in accordance to the one or more embodiments disclosed in the present disclosure from FIGS. 4 to 6, however it may be apparent to a person skilled in the art that the system and method disclosed in this application may be implemented using a plurality of embodiments and these embodiments may only be construed for understanding the working of the present system and method and not limit the scope of the instant application.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for planogram compliance check based on visual analysis, the method comprising:

receiving, by a processor, at least one product shelf images captured using an image capture device (200);

identifying, by the processor, a region of interest (ROI) from the at least one product shelf images;

generating, by the processor, at least one rectified shelf image by applying a perspective distortion rectification of the identified region of interest (ROI) of the at least one product shelf image, wherein applying the perspective distortion rectification comprises applying projective geometry rectification using the corner points of the identified region of interest (ROI);

extracting, by the processor, one or more rows from the rectified shelf image wherein the rectified shelf image comprises a plurality of horizontal row partitions;

generating, by the processor, a distance map to estimate occupancy for each of the extracted one or more rows from the rectified shelf image based on a Hausdorff metric based distance map, wherein the distance map is generated by calculating a local distance map for the at least one product shelf image and a predefined reference shelf image based on the Hausdorff metric based distance map and comparing local areas of the at least one product shelf image and the predefined reference shelf image;

estimating, by the processor, the occupancy for each of the extracted one or more rows based on the generated map and a preexisting Hausdorff based image map generated for the predefined reference shelf image, wherein estimating the occupancy comprises estimating one of a partially missing product based on chi-square distance and a completely missing product based on Euclidean distance in each of the extracted one or more rows;

deriving, by the processor, a product count and placement information for each of the extracted one or more rows based on the extracted rows and the estimated occupancy; wherein the deriving a product count and placement information further comprises:

detecting a product based on texture properties of a product image wherein the product image is a part of the at least one rectified shelf image, by matching the texture properties of the product image with a predefined reference product shelf image, and wherein the texture properties are detected by applying a SURF feature based detection on the product image; and eliminating one or more false positives product detection by matching a color histogram of the product image with the predefined reference product shelf image, wherein one or more false positives product detection are eliminated by applying normalized color histogram and using Bhattacharya distance for measuring a similarity between the color histogram of the product image and the predefined reference product shelf image; and performing, by the processor, the planogram compliance check for the at least one rectified shelf image based on the derived product count and the placement information.

2. The method according to claim 1 wherein extracting one or more rows comprises:

generating a chg-img by finding all vertical changes in the image using Sobel derivative;

applying Hough transform on the chg-img to detect all possible horizontal lines; and extracting the one or more rows by identifying most prominent horizontal lines in the shelf.

3. A system (102) for planogram compliance check based on visual analysis, the system (102) comprising an image capture device (200) operatively coupled to the system, a processor (202) and an interface (204), a memory (206) storing instructions coupled to said processor (202), wherein said processor (202) is configured by said instructions to:

receive at least one product shelf images captured by the image capture device (200);

identify a region of interest (ROI) from the at least one product shelf images;

generate at least one rectified shelf image by applying a perspective distortion rectification of the identified region of interest (RO) of the at least one product shelf image, wherein applying the perspective distortion rectification comprises applying projective geometry rectification using the corner points of the identified region of interest (ROI);

extract one or more rows from the rectified shelf image wherein the rectified shelf image comprises a plurality of horizontal row partitions;

generate a distance map to estimate occupancy for each of the extracted one or more rows from the rectified shelf image based on a Hausdorff metric based distance map, wherein the distance map is generated by calculating a local distance map for the at least one product shelf image and a predefined reference shelf image based on the Hausdorff metric based distance map and comparing local areas of the at least one product shelf image and the predefined reference shelf image;

estimate the occupancy for each of the extracted one or more rows based on the generated map and a preexisting Hausdorff based image map generated for the predefined reference shelf image, wherein estimating the occupancy comprises estimating one of a partially missing product based on chi-square distance and a completely missing product based on Euclidean distance in each of the extracted one or more rows;

derive a product count and placement information for each of the extracted one or more rows based on the extracted rows and the estimated occupancy wherein the deriving a product count and placement information further comprises:

detecting a product based on texture properties of a product image wherein the product image is a part of the at least one rectified shelf image, by matching the texture properties of the product image with a predefined reference product shelf image, and wherein the texture properties are detected by applying a SURF feature based detection on the product image; and eliminating one or more false positives product detection by matching a color histogram of the product image with the predefined reference product shelf image, wherein one or more false positives product detection are eliminated by applying normalized color histogram and using Bhattacharya distance for measuring a similarity between the color histogram of the product image and the predefined reference product shelf image; and perform the planogram compliance check for the at least one rectified shelf image based on the derived product count and the placement information.

4. The system according to claim 3, wherein the processor (202) is configured to:

generate a chg-img by finding all vertical changes in the image using Sobel derivative: apply Hough transform on the chg-img to detect all possible horizontal lines; and extract the one or more rows by identifying most prominent horizontal lines in the shelf.

5. A non-transitory computer readable medium comprising thereon instruction which when executed by a possessor on a system, cause the processor to perform a method comprising:

receiving at least one product shelf images captured using an image capture device (200);

identifying a region of interest (ROI) from the at least one product shelf images;

generating at least one rectified shelf image by applying a perspective distortion rectification of the identified region of interest (ROI) of the at least one product shelf image, wherein applying the perspective distortion rectification comprises applying projective geometry rectification using the corner points of the identified region of interest (ROI);

extracting one or more rows from the rectified shelf image wherein the rectified shelf image comprises a plurality of horizontal row partitions;

generating a distance map to estimate occupancy for each of the extracted one or more rows from the rectified shelf image based on a Hausdorff distance metric based distance map, wherein the distance map is generated by calculating a local distance map for the at least one product shelf image and a predefined reference shelf image based on the Hausdorff metric based distance map and comparing local areas of the at least one product shelf image and the predefined reference shelf image;

estimating the occupancy for each of the extracted one or more rows based on the generated map and a preexisting Hausdorff based image map generated for the predefined reference shelf image, wherein estimating the occupancy comprises estimating one of a partially missing product based on chi-square distance and a completely missing product based on Euclidean distance in each of the extracted one or more rows;

deriving a product count and placement information for each of the extracted one or more rows based on the extracted rows and the estimated occupancy wherein the deriving a product count and placement information further comprises:

detecting a product based on texture properties of a product image wherein the product image is a part of the at least one rectified shelf image, by matching the texture properties of the product image with a predefined reference product shelf image, and wherein the texture properties are detected by applying a SURF feature based detection on the product image; and eliminating one or more false positives product detection by matching a color histogram of the product image with the predefined reference product shelf image, wherein one or more false positives product detection are eliminated by applying normalized color histogram and using Bhattacharya distance for measuring a similarity between the color histogram of the product image and the predefined reference product shelf image; and performing the planogram compliance check for the at least one rectified shelf image based on the derived product count and the placement information.

6. The non-transitory computer readable medium according to claim 5 further comprising thereon instruction which when executed by a processor on a system cause the system to extract one or more rows from the rectified shelf image wherein the method for extracting one or more rows comprises:

generating a chg-img by finding all vertical changes in the image using Sobel derivative;

applying Hough transform on the chg-img to detect all possible horizontal lines; and extracting the one or more rows by identifying most prominent horizontal lines in the shelf.

* * * * *